(12) United States Patent
Shibutani

(10) Patent No.: US 6,575,639 B2
(45) Date of Patent: Jun. 10, 2003

(54) OPTICAL ADAPTER

(75) Inventor: Michitomo Shibutani, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 09/945,631

(22) Filed: Sep. 5, 2001

(65) Prior Publication Data

US 2002/0031309 A1 Mar. 14, 2002

(30) Foreign Application Priority Data

Sep. 6, 2000 (JP) .......................................... 2000-269929

(51) Int. Cl.$^7$ ................................................. G02B 6/36
(52) U.S. Cl. ......................................................... 385/53
(58) Field of Search .............................. 385/53, 54, 55, 385/56, 58, 59, 66, 71, 72

(56) References Cited

U.S. PATENT DOCUMENTS

| 5,537,501 | A | * | 7/1996 | Iwano et al. .................. 385/56 |
| 5,542,015 | A | * | 7/1996 | Hultermans ................. 385/139 |
| 5,937,121 | A | * | 8/1999 | Ott et al. ....................... 385/59 |
| 6,027,252 | A | * | 2/2000 | Erdman et al. ................ 385/53 |
| 6,364,534 | B1 | * | 4/2002 | Lampert ....................... 385/53 |

* cited by examiner

Primary Examiner—Tulsidas Patel
(74) Attorney, Agent, or Firm—Kanesaka & Takeuchi

(57) ABSTRACT

An optical adapter for receiving a plurality of detachable plugs (11) to which optical cables are connected. The optical adapter comprises a conductive housing (17) having a plurality of conductive cavities (22) for receiving the detachable plugs (11) and a plurality of conductive partition walls (21) provided between the plugging cavities (22). The conductive housing (17) is attached to a conductive panel (37) to electrically connect the optical adapter to the conductive panel (37).

5 Claims, 7 Drawing Sheets

US 6,575,639 B2

OPTICAL ADAPTER

BACKGROUND OF THE INVENTION

1. Field of the Invention

The present invention relates to an adapter of an optical connector for connecting optical cables.

2. Description of the Related Art

With rapid advance of optical communication system that employs optical cables, there is increasing concern about electromagnetic waves given off by the various communication devices that constitute the optical communication system. There is an increasing demand for an optical connector that connects optical cables or an optical cable and another optical device with no or little leak of electromagnetic waves.

An optical connector consists of a plurality of detachable plugs connected to optical cables and an adapter for retaining in alignment the detachable plugs. Japanese patent application Kokai No. 10-39170 discloses an optical connector with an anti-leak device. As shown in FIG. 12, an adapter 1 comprises conductive housings 2a and 2b to be connected to the ground face 4 of a panel 3 via a ground spring (not shown). A conductive plug 5 is plugged into the adapter 1 so that the conductive plug 5 and the conductive housings 2a and 2b are electrically connected to the ground face 4, preventing leak or entrance of electromagnetic waves.

In the above optical connector, however, there are gaps between the adjacent plugs connected to the adapter, causing leak of electromagnetic waves, which inadvertently affects other electronic devices, or entrance of electromagnetic waves to cause interference with communications.

SUMMARY OF THE INVENTION

Accordingly, it is an object of the invention to provide an optical adapter capable of receiving a plurality of plugs with no or little leak or entrance of electromagnetic waves.

According to the invention there is provided an optical adapter to be attached to a panel, comprising a conductive housing having a plurality of plugging cavities for receiving a plurality of detachable plugs to which optical cables are connected; and a plurality of conductive partition walls provided between the plugging cavities.

According to another aspect of the invention there is provided an optical adapter to be attached to a panel, comprising a conductive housing having a plurality of plugging cavities for receiving a plurality of detachable plugs to which optical cables are connected; a plurality of conductive intermediate walls for dividing the plugging cavities such that the detachable plugs are connected through the intermediate walls.

It is preferred that a conductive attaching member is provided to attach the conductive housing to the panel for electric conduction.

According to the invention, the housing is electrically connected to the panel via the panel attaching member and the partition walls are provided between the plugging cavities, and the intermediate walls reduce the opening areas within the plugging cavities so that leak and entrance of electromagnetic waves are minimized.

DESCRIPTION OF THE PREFERRED EMBODIMENTS

An optical connector consists of a plurality of detachable plugs connected to optical cables and an optical adapter to which the detachable plugs are connected.

Figure 1:
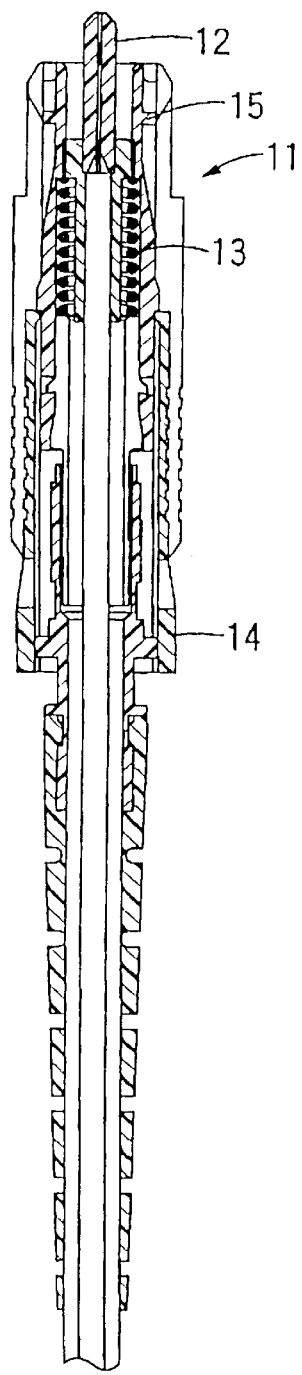
FIG. 1 is a sectional view of a detachable plug.

In FIG. 1, a two-prong plug 11 comprises a pair of ferrules 12 each receiving a core wire (not shown) of an optical cable, a pair of spring 13 for forwardly biasing the ferrules 2, a pair of housings 14 each accommodating the ferrule 12 and the spring 13 and having a pair of engaging members 15 on opposite sides.

In FIGS. 2–5, an adapter 16 comprises a die-cast housing 17 of a conductive material, a plurality of insulator bodies 18 press-fitted in the housing 17, a plurality of split sleeve receiving caps 19 of an insulative material, and a plurality of cylindrical sleeves 20 of a metallic material. A plurality of partition walls 21 are provided in the housing 17 to define a plurality of plugging cavities 22 in a stepped fashion for receiving the detachable plugs 11. It is preferred that the partition walls 21 are die-cast from a conductive material integrally with the housing 17. A plurality of intermediate walls 29 are provided in the middle of the plugging cavities 22 in a direction perpendicular to the partition walls 21. It is preferred that the intermediate walls 29 are molded integrally with the housing 17. A plurality of flange portions 23 extend on the outside of the housing 17 at a constant inside angle, such as 45 degrees, with respect to the plugging direction. A plurality of engaging holes 42 are provided near the flange portions 23. At least one end of the housing 17 is folded back to provide a folded section 40, which covers the end portion 41 of the insulation body 18.

Two sets of plug locks 24, each consisting of two opposed plug locks 24, are provided on the insulation body 18 of each plug cavity 22. Each plug lock 24 is made in the form of a cantilevered beam that extends in the plugging direction and has an engaging projection 25 extending inwardly from the free end. A plurality of wedge-shaped raised portions 43 are provided in the middle of the outside of the insulation body 18 for engagement with the engaging holes 42 to cooperate with the end portion 41 for preventing the insulation body 18 from falling from the housing 17. A pair of cylindrical split sleeve receiving sections 26 are provided in the plugging cavities 22 through the intermediate wall 29.

A separation stop 27 raised inwardly from the front end of the split sleeve receiving sections 26. The sleeve receiving caps 19 are providing so as to correspond to the split sleeve receiving sections 26. A separation stop 28 is provided on the front end of the split sleeve receiving caps 19. Thus, when the two-prong plug 11 is plugged in each plugging cavity 22, the split sleeve receiving caps and sections 19 and 26 retain the split sleeves 20 for sliding motion between the separation stops 27 and 28.

A panel attaching member 30 of a conductive material is provided on the outside of the housings 17 for electrical conduction. A pair of panel bearing tabs 33 are provided on each side 31 and 32 of the panel attaching member 30 so as to extend along the inside of the flange sections 23, and the front end 34 of the cantilevered beam 33 is bent away from the flange section. An adapter lock 35 is made as a cantilevered beam near each front end 34 of the panel bearing tabs 33 such that its front end 36 is bent outwardly so as to face the front end 34 of the panel bearing tab 33.

Figure 2:
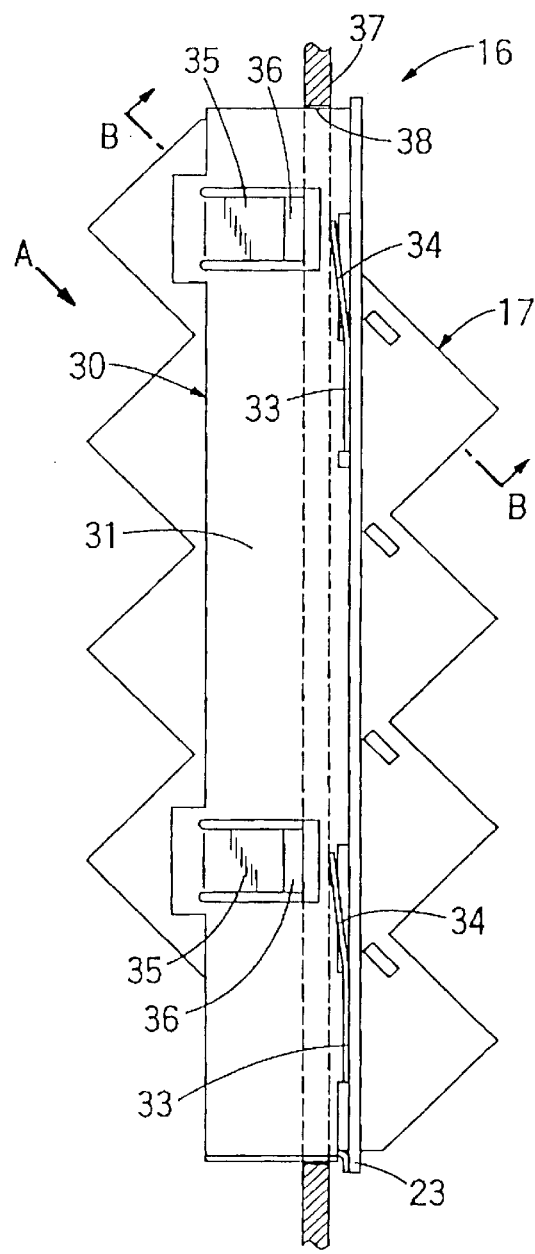
FIG. 2 is a side view of an optical adapter according to an embodiment of the invention.
Figure 3:
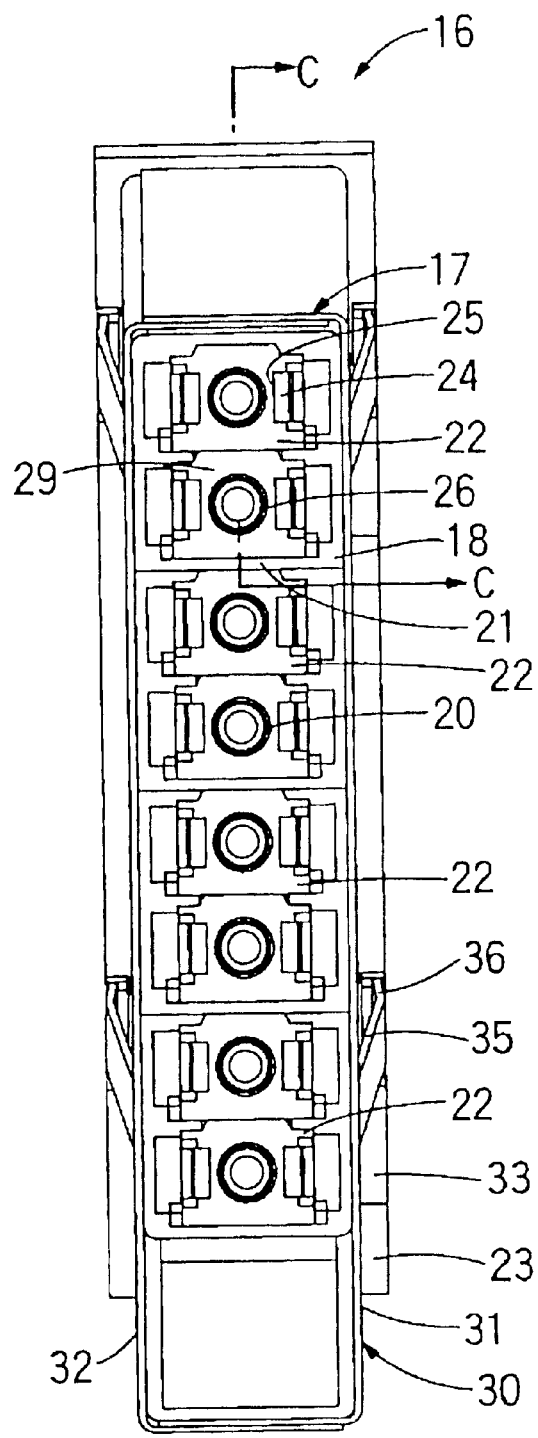
FIG. 3 is a rear view of the optical adapter as viewed from an arrow A of FIG. 2.
Figure 4:
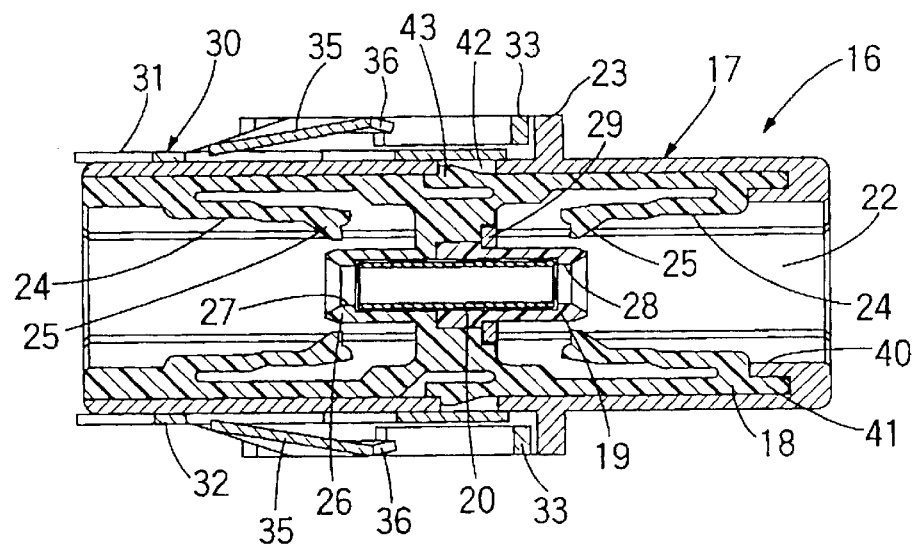
FIG. 4 is a sectional view taken along line B—B of FIG. 2.
Figure 5:
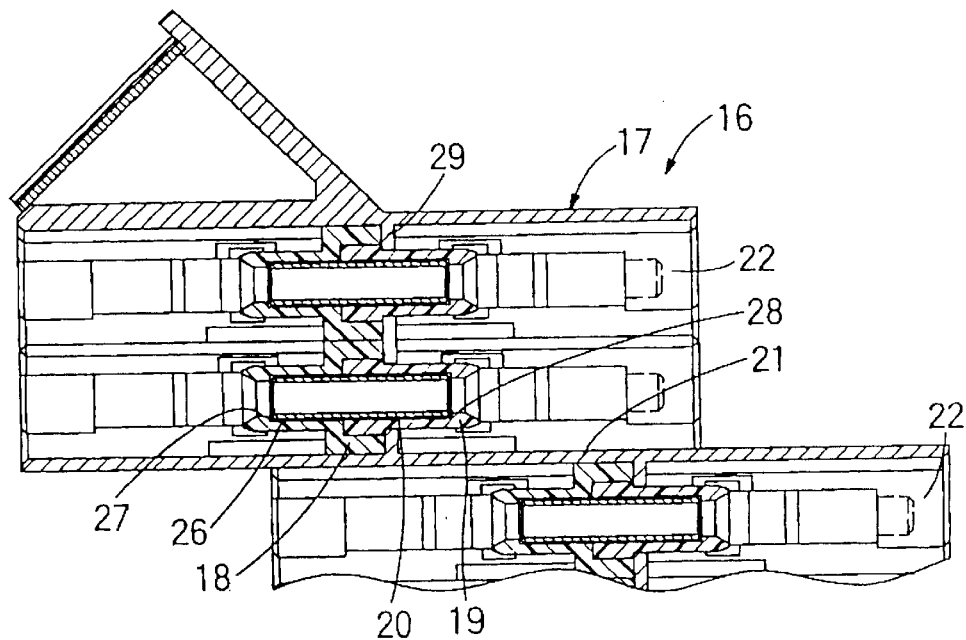
FIG. 5 is a sectional view taken along line C—C of FIG. 3.
Figures 6, 7:
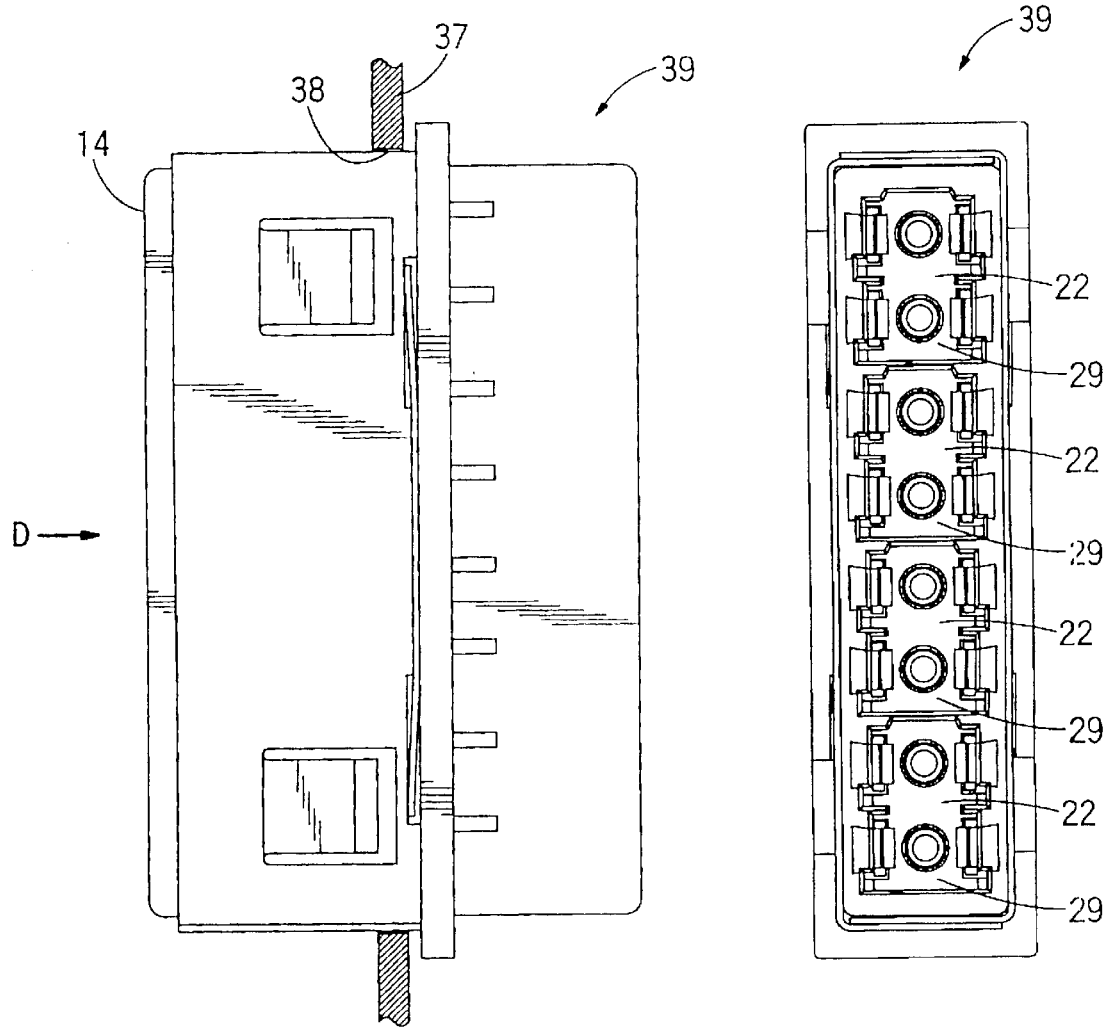
FIG. 6 is a side view of an optical adapter according to another embodiment of the invention.
FIG. 7 is a rear view of the optical adapter as viewed from an arrow D.

In FIG. 2, to attach the adapter 16 to a panel 37, when the adapter 16 is inserted into the opening 38 of the panel 37 from the side of adapter locks 35, the adapter locks 35 are flexed inwardly by the periphery of the opening 38. When the adapter locks 35 pass through the opening 38, they return to the original conditions to hold the periphery of the opening 38 between the front ends 34 and 36 of the panel bearing tabs 33 and the adapter locks 35. The spring forces of the panel bearing tabs 33 hold the panel 37 in place, with the front ends 34 being in contact with the ground face (not shown) of the panel 37 to make conductive between the panel attaching member 30 and the panel 37. The plugging cavities 22 are tilted by 45 degrees relative to the flange section 23 so that the adapter 16 is secured to the panel 37 under the 45-degree tilted condition.

Figure 9:
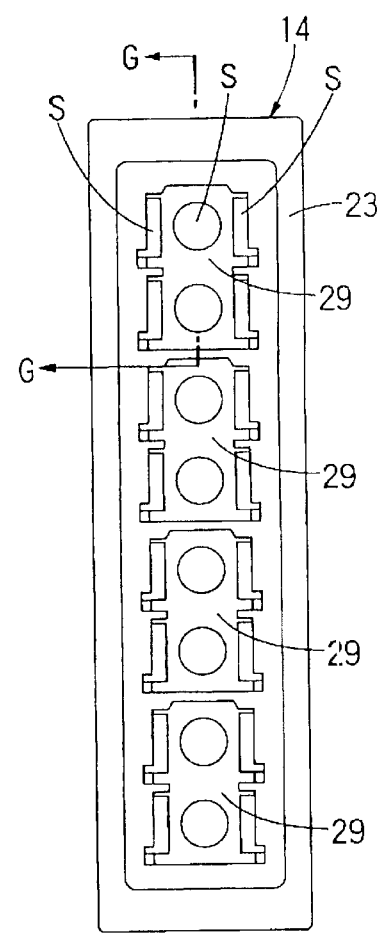
FIG. 9 is a rear view of the conductive housing as viewed from an arrow E.
Figure 10:
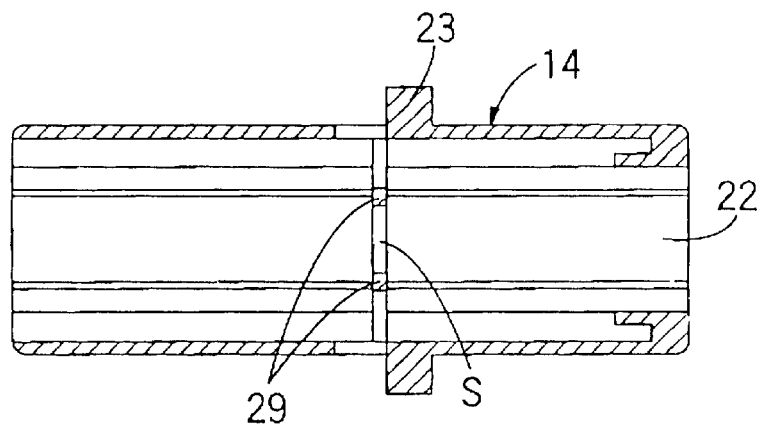
FIG. 10 is a sectional view taken along line F—F of FIG. 8.
Figure 11:
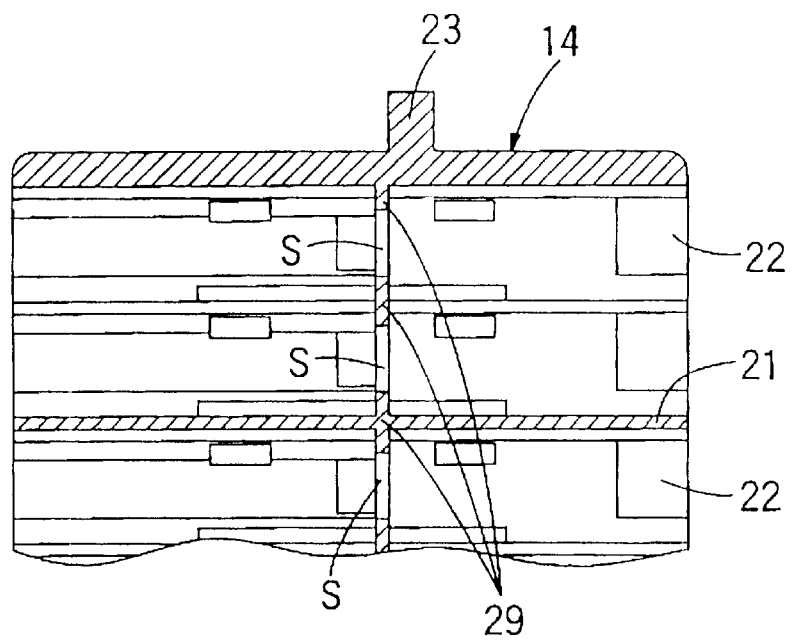
FIG. 11 is a sectional view taken along line G—G of FIG. 9.
Figure 12:
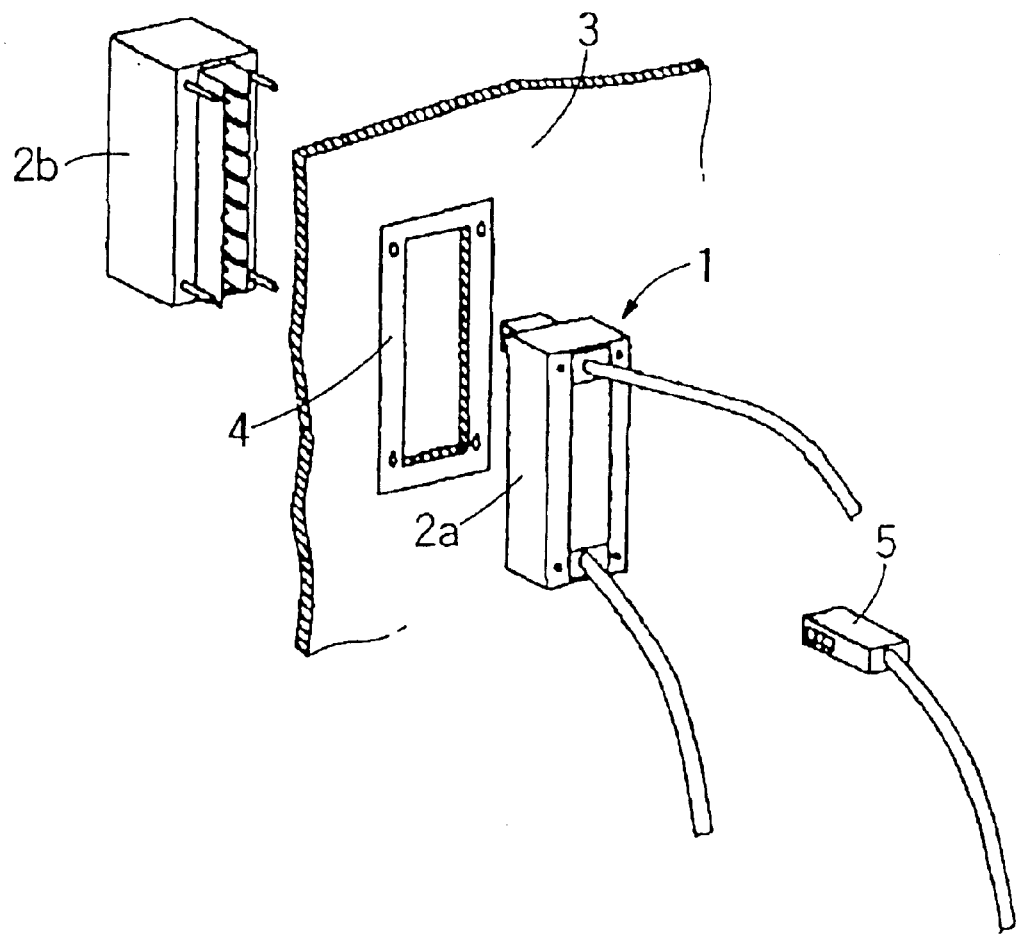
FIG. 12 is a perspective view of a conventional optical adapter.

The plug locks 24 flex outwardly and then return to the original conditions, engaging the engaging portions 25 with the plug-side engaging portions 15. Thus, the respective two-prong plugs 11 are locked in the plug cavities 22, with the respective ferrules inserted and aligned in the split sleeves 20. The housings 17 are conductive with the ground face of the panel 37 via the panel attaching members 30 so that it is possible to prevent leak or entrance of electromagnetic waves. The partition walls 21 provided between the plugging cavities 22 cut off transfer of electromagnetic waves between the plugging cavities 22. As shown in FIGS. 9–11, the intermediate walls 29 reduce the opening area within the plugging cavities 22 so that it is possible to prevent leak and entrance of electromagnetic waves.

Alternatively, as shown in FIGS. 6–11, an adapter 39 is attached to the panel 37 in a normal condition in contrast to the adapter 16 that is attached in a stepwise tilted condition. The intermediate walls 29 may be made separately from the housings 17 such that the shield plate enter the plugging cavities 22 so as to make contact with the housings 17 and partition walls 21.

Figure 8:
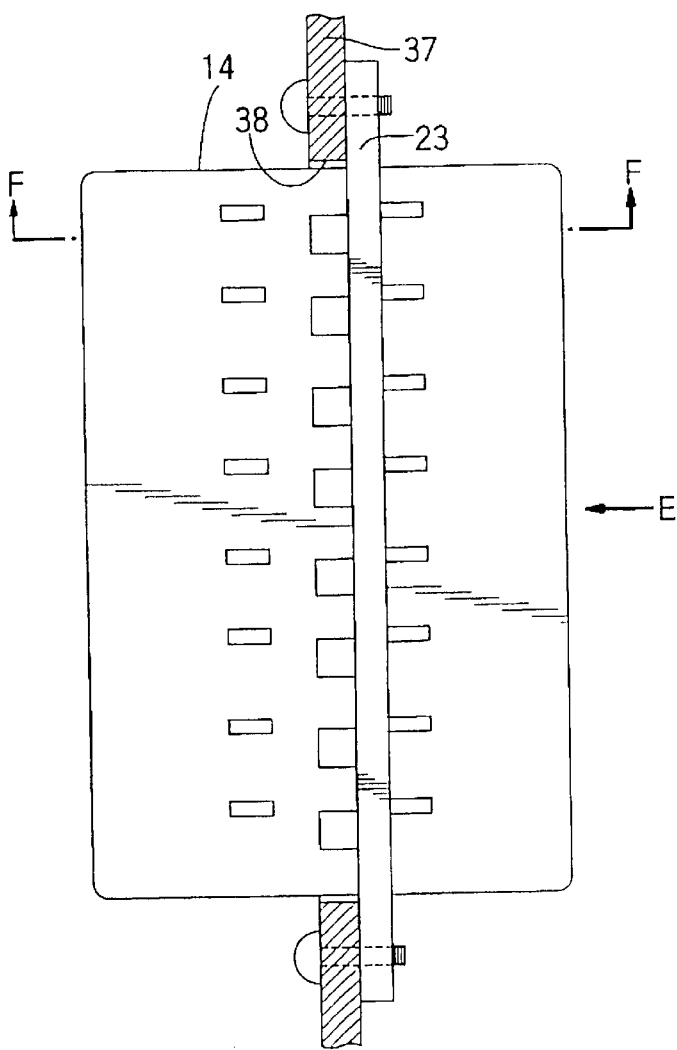
FIG. 8 is a side view of a conductive housing for the optical adapter of FIG. 6.

In FIG. 8, the adapter is directly attached to the panel 37 with fasteners, such as screws, thus eliminating the panel attaching members 30. The plugging cavities 22 may be made so as to receive single-prong plugs instead of the two-prong plugs 11.

As has been described above, according to the invention, the partition walls are provided in the plugging cavities and the intermediate walls reduce the opening area in the plugging cavities so that leak or entrance of electromagnetic waves is minimized.

What is claimed is:

1. An optical adapter to be attached to a panel, comprising:

a conductive housing having at least one plugging cavity for receiving at least one detachable plug to which optical cable is connected;

an insulator body provided in said conductive housing and having a split sleeve receiving section and at least two plug locks to engage said detachable plugs; and a conductive intermediate wall for dividing said plugging cavity into two opposing subcavities, said conductive intermediate wall having a first opening for receiving said split sleeve receiving section so that said detachable plugs are connected through said split sleeve receiving section and a second opening provided outside said first opening for receiving one of said plug locks, thereby substantially covering said plug cavity.

2. The optical adapter according to claim 1, which further comprises a conductive attaching member having a panel bearing tab and an adapter lock for attaching said conductive housing to said panel for electric conduction.

3. The optical adapter according to claim 1, wherein said conductive housing has an engaging hole and said insulator body has a raised portion to engage with said engaging hole of said housing to lock said insulator body to said housing.

4. The optical adapter according to claim 1, wherein said conductive intermediate wall is integrally made with said housing.

5. The optical adapter according to claim 1, which further comprises at least one conductive partition wall provided between said plugging cavities and integrally made with said housing.

* * * * *